United States Patent [19]

Kintz, Jr. et al.

[11] Patent Number: 4,571,518
[45] Date of Patent: Feb. 18, 1986

[54] TEMPERATURE SENSOR POCKET FOR DYNAMOELECTRIC MACHINE WINDING

[75] Inventors: Lawrence J. Kintz, Jr.; Edward S. Blain, both of Rockford, Ill.

[73] Assignee: Sundstrand Corporation, Rockford, Ill.

[21] Appl. No.: 682,270

[22] Filed: Dec. 12, 1984

[51] Int. Cl.⁴ .......................................... H02K 11/00
[52] U.S. Cl. ............................... 310/68 R; 310/68 C
[58] Field of Search ................... 310/68 R, 68 C, 71; 174/138 F

[56] References Cited

U.S. PATENT DOCUMENTS

| | | |
|---|---|---|
| 2,369,986 | 2/1945 | Schaefer . |
| 2,471,840 | 5/1949 | Seely . |
| 2,717,945 | 9/1955 | Dresios et al. . |
| 2,909,719 | 10/1959 | Dubberley . |
| 3,127,531 | 3/1964 | Tothero . |
| 3,131,322 | 4/1984 | Pleiss, Jr. et al. . |
| 3,200,274 | 8/1965 | Munier . |
| 3,219,856 | 11/1965 | Dunwiddie et al. . |
| 3,422,313 | 1/1969 | Snoberger et al. . |
| 3,521,212 | 7/1970 | Waseleski, Jr. et al. . |
| 3,646,494 | 2/1972 | Waseleski, Jr. et al. . |
| 3,748,510 | 7/1973 | McNeal . |
| 3,842,297 | 10/1974 | Pleiss, Jr. et al. . |
| 4,028,570 | 6/1977 | Kieffer et al. . |
| 4,112,405 | 9/1978 | Joseph . |
| 4,181,393 | 1/1980 | Lill . |
| 4,188,553 | 2/1980 | Wheaton . |
| 4,203,045 | 5/1980 | Buchanan et al. . |
| 4,230,961 | 10/1980 | Calfe et al. . |
| 4,250,419 | 2/1981 | Zolman . |
| 4,328,438 | 5/1982 | Zolman . |

FOREIGN PATENT DOCUMENTS 52-46401 11/1977 Japan .
55-46135 11/1980 Japan .

Primary Examiner—Donovan F. Duggan
Attorney, Agent, or Firm—Wood, Dalton, Phillips, Mason & Rowe

[57] ABSTRACT

Difficulties in sensing the temperature of end turns in dynamoelectric machines are avoided through the use of an envelope containing a temperature sensor disposed between abutting sets of end turns in such machine. The envelope has two insulating plies formed of insulating material sandwiching a ply formed of metal having excellent thermal conductivity. The latter is bonded to the former such that an exposed edge of the insulating plies exists by which the envelope may be closed to totally encapsulate the metal ply.

10 Claims, 6 Drawing Figures

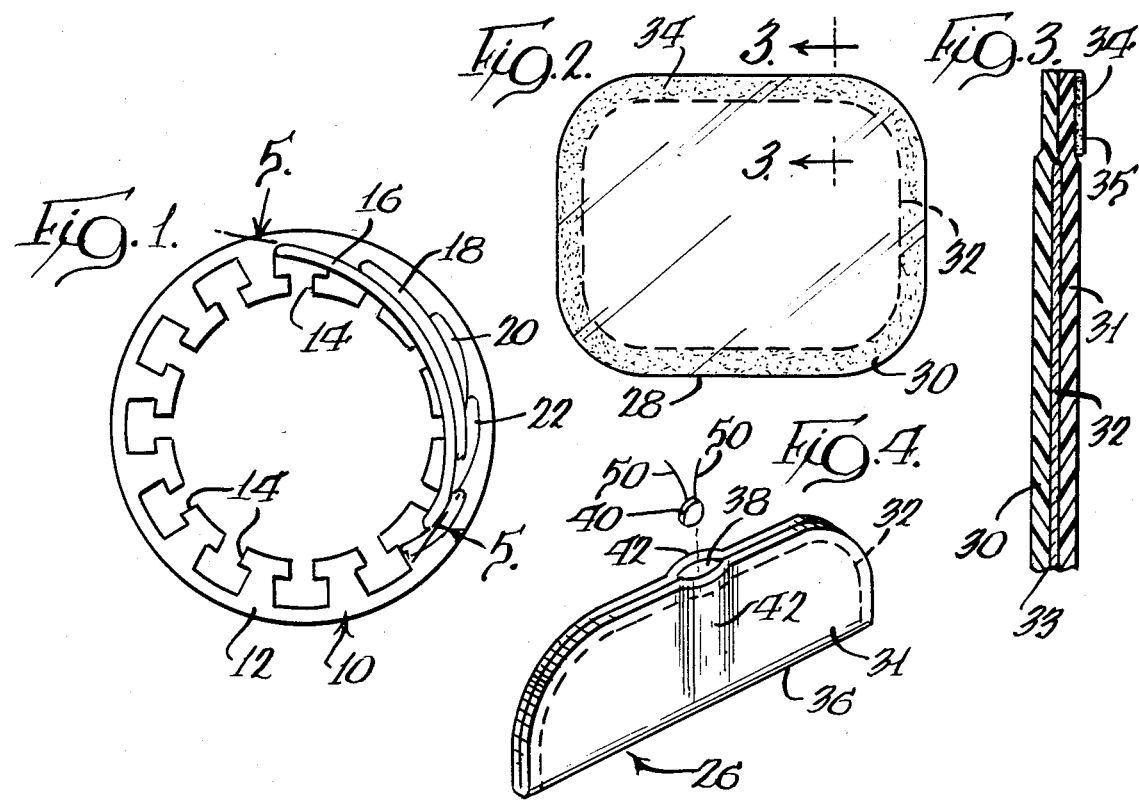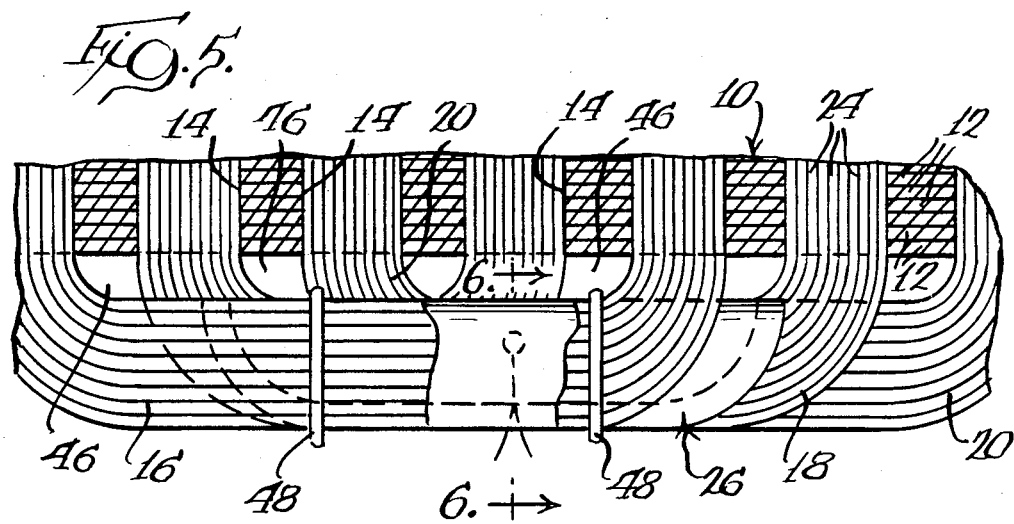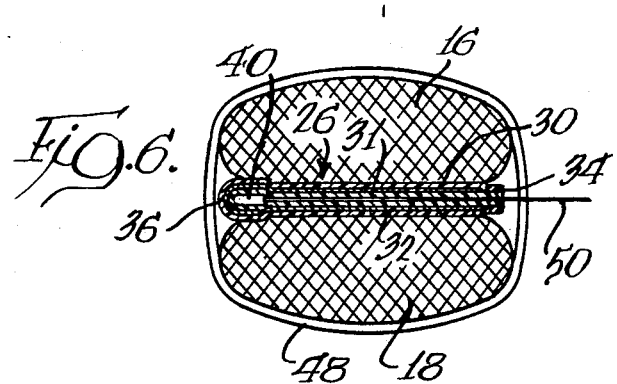

TEMPERATURE SENSOR POCKET FOR DYNAMOELECTRIC MACHINE WINDING

FIELD OF THE INVENTION

This invention relates to a protector for use in electric machines, and more specifically, to a thermal overload sensor pocket construction for use in dynamoelectric machines such as motors or generators.

BACKGROUND OF THE INVENTION

The most pertinent prior art known to the applicant is U.S. Pat. No. 3,131,322 issued Apr. 28, 1964 to Pleiss et al.

It has long been desirable to provide various protection schemes for dynamoelectric machines which sense an impending undesirable condition and provide a signal or take action in response to such impending condition to alter the mode of operation of the machine. Perhaps the most common examples are thermal overload protectors employed in motors. In such devices, the temperature of some part of the motor, typically some part of the stator, is subject to continuous monitoring. When the temperature achieves some predetermined elevated value above that which could cause breakdown of winding insulation or other heat related problems, the circuit to the motor is opened in response to the detection of the elevated temperature.

To be complete reliable, the temperature sensor must be properly placed within the machine. While the sensor can be associated with the stator iron, it is frequently preferred to avoid such a location since heat generated in the windings within the stator iron is readily conducted away through the iron to a housing or to a coolant when back iron cooling is employed. Consequently, stator iron temperatures are typically lower than temperatures elsewhere in the windings. Conventional wisdom thus suggests that the sensor be disposed in some relation with the winding end turns. As is well known, the end turns emerge from the stator iron to be substantially in contact only with each other and the ambient air. As a consequence, they will not run as cool as the remainder of the stator with the result that monitoring of the end turn temperature provides a more accurate indication of impending overheating.

The problem then becomes one of properly disposing a thermal sensor in good heat transfer relation with the winding end turns. One approach may involve the disposition of the sensor within the windings after they have been inserted into the stator iron, but prior to varnish impregnation. The difficulty with this approach is that it will frequently involve some deformation of the conductors forming the windings which are typically varnished wires. The deformation may crack or otherwise weaken the varnish with the results that its insulation qualities are lessened. Consequently, the resulting machine may be more prone to failure due to the weakened insulation.

Another approach is to dispose the sensor within the windings as they are being inserted into the stator. This approach will assure an intimate heat transfer association between the windings and the sensor but is subject to other difficulties. For one, in the event of sensor failure, the same cannot be easily removed and replaced without deforming the windings which in turn may cause a loss of insulation qualities. For another, many sensors are sensitive to the physical forces involved in handling and winding and thus may be partially or wholly rendered inoperative during the process of forming the windings about the sensors.

Still another approach is exemplified by the above identified Pleiss et al patent wherein a sensor receiving pocket is disposed in the windings as they are formed. This approach eliminates a number of the difficulties mentioned previously but unless good care is taken, there is a possibility that a metal thermal conductor employed in such a construction may inadvertantly contact the windings. If there is an insulation failure at such point of contact, a short affecting motor performance or leading to a localized hot spot can result.

The present invention is directed to overcoming one or more of the above problems.

SUMMARY OF THE INVENTION

It is the principal object of the invention to provide a new and improved protector for use in a dynamoelectric machine. More specifically, it is object of the invention to provide a new and improved temperature sensor pocket construction for use in electrical machine windings.

An exemplary embodiment of the invention achieves the foregoing object in a construction including an elongated, substantially sealed envelope formed of two thin plies of electrically insulating material sandwiching a thin ply of thermally conductive metal. The metal ply stops short of the edges of the insulating plies and the edges of the insulating plies are adhered to each other to define the envelope. The envelope is provided with a small opening between the edges of the insulating plies and a sensor is disposed within the envelope in heat transfer relation with the metal ply through one of the insulating plies and has electrical leads extending out of the envelope through the opening. At least two sets of electrical windings sandwich the envelope.

In a preferred embodiment, the windings are end turns emerging and extending from an end of a body of magnetizable material and one set is angularly staggered with respect to the other set to define windows between the points of emergence of the sets from the body. Ties are disposed about the sets and extend through the windows and locate the envelope between the sets.

In a highly preferred embodiment, the opening is located oppositely of the body of magnetizable material and is sized so that the sensor may be readily removed from or replaced in the envelope.

The invention contemplates that the envelope be formed by folding the plies and that the ties substantially abut the envelope at the fold therein and at the edges oppositely of the fold to locate the envelope in the windings.

The plies are typically formed of tape-like material. Other objects and advantages will become apparent from the following specification taken in connection with the accompanying drawings.

DESCRIPTION OF THE DRAWINGS

FIG. 1 is a side elevation of a stator for a dynamoelectric machine embodying the invention;

FIG. 2 is a plan view of a construction employed in forming an envelope for a sensor;

FIG. 3 is an enlarged, sectional view taken approximately along the line 3—3 in FIG. 2;

FIG. 4 is an exploded view of an envelope and a sensor made according to the invention;

FIG. 5 is a sectional view taken approximately along the line 5—5 in FIG. 1; and FIG. 6 is an enlarged sectional view taken approximately along the line 6—6 in FIG. 5.

DESCRIPTION OF THE PREFERRED EMBODIMENT

An exemplary embodiment of the invention is illustrated in the drawings and with reference to FIG. 1 is seen in the environment of a stator 10 of a dynamoelectric machine. The stator 10 includes a series of ring-like iron laminations 12 having radially inwardly opening T-shaped slots at equally angularly spaced locations about the laminations 12.

As is well known, sets of end turns emerge from each of the slots 14 and are turned angularly to re-enter a different slot 14 at some predetermined angular relation to the originating slot. For example, as seen in FIG. 1, in a three phase machine, one set 16 of end turns emerges from the radially outer part of a slot 14 and traverses an angular distance of approximately 120 degrees to enter another slot 14 at a radially inner point. A second set of end turns 18 emerges from a slot 14 adjacent that from which the set 16 emerges and extends angularly approximately 120 degrees to reenter the radially inner portion of another one of the slots 14. This relationship is carried out by additional sets 20, 22, etc. of end turns in a conventional fashion which results in the sets 16, 18, 20, 22, etc. being staggered with respect to one another. The relationship is also shown in a developed sectional view such as seen in FIG. 5. As is conventional, each of the sets, 16, 18, 20 and 22 is made up of individual conductors or wires 24 which typically are varnished for insulation purposes.

According to the invention, an envelope, generally designated 26, for housing a sensor, is placed between and sandwiched by adjacent sets of the end turns. As seen in FIG. 5, such an envelope is sandwiched by the sets 16 and 18.

As seen in FIG. 2, the envelope 26 is made up of a blank 28. The blank 28, in turn, is formed of three sheets or plies 30, 31 and 32 of tape-like material bonded together as by an adhesive at their interface 33 (FIG. 3). The sheets 30, 31 and 32 are similar in shape in the geometric sense and, in the same sense, are non-congruent since they are of dissimilar size. Specifically, the sheets 30 and 31 are identical and are larger than the sheet 32 and the latter is centered on the former. In a preferred embodiment, the sheets 30 and 31 are made of an insulating material such as polyimide while the sheet 32 is made of a highly thermally conductive metal such as copper; and the sheets 30 and 31 sandwich the sheet 32.

By reason of the dissimilarity in size of the sheets 30 and 31 on the one and and the sheet 32 on the other, upon the centering of the sheet 32 between the sheets 30 and 31, a peripheral free edge or border 34 of the sheet 31 exists. The free edge 34 is provided with an adhesive 35 as shown by the stipling thereon.

The envelope 26 is formed by centrally folding the blank 28 along a line 36 to bring the free edge 34 with the adhesive 35 thereon into contact as illustrated in FIG. 4. Preferably, centrally of the envelope and opposite of the fold line 36, a small opening 88 is left. Such opening 38 can be formed by, for example, folding the sheet on any sort of pocket-forming object which may be in the form of a bolt, a dowel, or even a temperature sensor 40 which will ultimately be received in the envelope through the opening 38. This will result in slightly convex formation 42 on both sides of the envelope 26 which are elongated in a direction generally transverse to the fold line 36.

It is preferred to use a pocket-forming object other than a sensor 40, such as a so-called "dummy sensor", which will remain in place until the envelope 26 is finally located between the winding sets 16 and 18.

In particular, with one of the winding sets as, for example, the set 16 in place, the envelope 26 is formed and preferably made elongated as illustrated so as to be capable of being in contact with the sets 16 and 18 along the interface of the two as seen in FIG. 5. With the set 16 in place, the envelope 26 may be located upon it and then the set 18 installed. This will result in intimate contact between the sets 16 and 18 on the one hand and the envelope 26 on the other to provide a good heat transfer relation. If a pocket-forming object other than a sensor 40 is in place during this procedure, one need not worry about damage to a sensor. After the sets 16 and 18 are installed, one need merely remove the object and then install the sensor 40 in the already formed pocket.

As is well known, the formation of the sets 16, 18, 20 and 22 will result in the provision of so-called "windows" 46 immediately adjacent the end of the body 10. The windows 46 are located between the slots 14. After the windings have been formed, ties 48 of twine or the like may be located about the sets and extend through the windows 46. In addition to providing their usual purpose, the ties 48 serve to locate the envelope 26 properly in sandwiched relation between two adjacent ones of the sets 16, 18, 20 and 22. Specifically, and as seen in FIGS. 5 and 6, the ties 48 abut the envelope 26 at the fold line 36 and at the free edges 34 remote from the fold line 36 thereby centering the envelope 26 between the sets 16 and 18 as illustrated. This prevents the envelope 26 from being located too far axially inwardly toward the body 10 which would interfere with good heat transfer relation.

After the envelope 26 is installed as mentioned previously, where a dummy sensor is utilized to form the pocket, the same can be removed and the actual sensor 40 installed through the opening 38. The opening 38 is, of course, sized so as to allow such installation as well as removal of the sensor 40 in the event it requires replacement. Electrical leads 50 of the sensor 40 extend outwardly from the opening 38 to be connected into the electrical circuit for the machine as desired.

The copper sheet 32 acts to gather heat over a substantial area of the end turn sets 16 and 18 and, being an excellent thermal conductor, transfers such heat to the sensor 40. Because the sensor monitors winding temperature across two insulating plies, a means of accurately detecting various motor winding temperatures is achieved by adjustment of the enclosed conductive metal surface area and/or utilization of sensors with various thermal response properties. At the same time, because the copper sheet 32 is totally encapsulated in the polyimide sheet 30, which is an electrical insulator, it is impossible for the sheet 32 to cause an electrical short which could result in lowering the operational efficiency of the machine or the development of a localized hot spot that could lead to failure.

Because the envelope 26 is located within the end turns as they are being fabricated, there is no need to deform the end turns to initially place the sensor 40 therein or to deform the end turns in the event the sensor 40 must be removed for replacement. Consequently, the possibility of weakening insulation due to such deformation is avoided.

At the same time, because the envelope 26 is located in the end turns at the time they are being fabricated, it will be in intimate, and thus excellent heat transfer, contact with the windings whose temperature is to be sensed.

It will also be appreciated that the invention lends itself to the provision of plural sensors in a single dynamoelectric machine. For example, three envelopes 26 with associated sensors could be disposed in respective windings of a three phase machine.

We claim:

1. A protector for use in electric machines comprising:
    an elongated, substantilly sealed envelope formed of two thin plies of electrically insulating material sandwiching a thin ply of thermally conductive metal bonded to said insulating pliesand stopping short of the edges of said insulating plies, the edges of said insulating plies being adhered to each other to define said envelope;
    a small opening to said envelope between the edges of said outer ply;
    a sensor within said envelope in heat transfer relation with said metal ply and having electrical leads extending out of said envelope through said opening; and
    at least two sets of electrical windings sandwiching said envelope.

2. The protector of claim 1 wherein said windings are end turns emerging and extending from an end of a body of magnetizable material and one set is angularly staggered with respect to the other set(s) to define windows between the points of emergence of said sets from said body, and ties about said sets extending through said windows and locating said envelope between said sets.

3. The protector of claim 2 wherein said opening is located oppositely of said body and is sized so that said sensor may be readily removed from and replaced in said envelope.

4. The protector of claim 2 wherein said envelope is formed by folding said plies and said ties substantially about said envelope at the fold therein and at said edges oppositely of said fold.

5. The protector of claim 1 wherein said plies are formed of tape-like material.

6. A protector for use in electrical machines comprising:
    a first thin sheet of insulating material; a thin sheet of metal having high thermal conductivity;
    said insulating and metal sheets having similar but noncongruent shapes with said metal sheet being smaller than said insulating sheets;
    said metal sheet being substantially centrally received between said insulating sheets and bonded thereto over their interfaces whereby said insulating sheets have exposed edges;
    said sheets being folded such that one said insulating sheet is outermost and the other said insulating sheet is innermost and said exposed edges are aligned;
    adhesive joining said exposed edges along their length;
    a small opening opposite the fold in said sheets;
    a sensor removably disposed between adjacent portions of said other insulating sheet through said opening; and
    electrical windings sandwiching said sheets and said sensor between said adjacent portions and in thermally conductive and electrically insulated relation therewith.

7. A protector for use in electrical machines comprising:
    a pair of thin sheets of insulating material;
    a thin sheet of metal having high thermal conductivity;
    said insulating and metal sheets having similar but noncongruent shapes with said metal sheet being smaller than said insulating sheets;
    said metal sheet being substantially centrally received between said insulating sheets and bonded thereto over their interfaces whereby said insulating sheets have exposed edges;
    a pocket forming object;
    said sheets being folded on said pocket forming object such that one said insulating sheet is outermost and the other said insulating sheet is innermost in abutment with said object and said exposed edges are aligned;
    adhesive joining said exposed edges along their length save for a small opening opposite the fold in said sheets and about said object; and
    electrical windings formed about and sandwiching said sheets and said object in thermally conductive and electrically insulated relation therewith with said object being removable through said opening.

8. The protector of claim 7 wherein said object is a thermal sensor.

9. The protector of claim 7 wherein said object is a dummy sensor.

10. The protector of claim 7 further including a plurality of ties binding said windings together and locating said sheets in a desired location with respect thereto.

* * * * *